May 28, 1963 G. PETERSON 3,091,695
MULTIPLEX RADIOACTIVITY WELL LOGGING SYSTEM
Filed Nov. 8, 1954 5 Sheets-Sheet 2

Fig. 2

INVENTOR.
GLEN PETERSON
BY
Robert K. Schumacher
ATTORNEY

INVENTOR.
GLEN PETERSON
ATTORNEY

Fig. 5

INVENTOR.
GLEN PETERSON

United States Patent Office 3,091,695
Patented May 28, 1963

1

3,091,695
MULTIPLEX RADIOACTIVITY WELL LOGGING
SYSTEM
Glen Peterson, Tulsa, Okla., assignor to Well Surveys,
Inc., a corporation of Delaware
Filed Nov. 8, 1954, Ser. No. 467,346
9 Claims. (Cl. 250—83.6)

This invention relates generally to the art of electrometry and more particularly to a method and apparatus for measuring or detecting phenomena such as extremely feeble electric currents, the presence and magnitude of small electric charges, the state of electrification of different bodies, etc. The instant invention finds specific application in that branch of electrometry art which makes use of one or more dynamic modulators to measure or indicate the state of electrification of a body or nodal point in an electric circuit.

The present invention, in its broadest conception, comprises a method and system for converting the above phenomena into electric signals by means of a dynamic modulator and transmitting them to a remote point where they can be identified and recorded.

The need for making measurements of the type encompassed here arises in the field of radioactivity well logging where it is necessary to make continuous records of natural radiations and a variety of induced radiations descriptive of the formations encountered in a bore hole. In this application the radiations are extremely weak and the bore hole will not accommodate large pieces of apparatus.

The need for making remote sensitive radioactivity measurements also exists in the field of atomic energy generation and control. In this application the radiations are extremely strong so that the lives of operating personnel are endangered if they get too close. At the same time operaitons must be controlled with a precision heretofore unknown, and this, in turn, means the ability to make a multiplicity of extremely delicate and precise measurements simultaneously at one or more points, the data being indicated generally at one point.

The several techniques of this invention are also applicable to making radioactivity measurements in a laboratory where there may be no need for the remote facilities engendered. The remote features and the extremely high sensitivity are both obtained through the same novel means. Also, the techniques made available by this invention are useful in fields apart from radioactivity. Delicate measurements made in the fields of chemistry, biology, etc., wherein glass electrodes and other types of probes are used to indicate the presence of electric charges, the state of electrification of a fluid or a solid, the flow of extremely feeble currents, etc., are all greatly facilitated by the apparatus and methods herein disclosed. In general, this invention is applicable to the solution of any problem which directly or indirectly involves a measurement of a state of electrification. Such measurements can be made by direct contact or through electrostatic induction.

The problem of measuring the intensity of radioactive radiations is first one of producing an electrical manifestation of the radiation. At the present time, one way of accomplishing this is by an ionization chamber wherein some of the radiation is absorbed by a gas, resulting in the dissociation of a small fraction of the gaseous atoms or molecules. The dissociated atoms or molecules are of course charged and are propelled through the gas by an electric field established between two electrodes. This results in the electrodes becoming electrically charged, and it is this state of charge that it is desired to measure. More specifically, this measurement is accomplished by letting the charge on the electrodes of the ionization chamber leak off through a high resistance and measuring the potential difference across the resistance produced by the flow of the leakage current. Such a potential difference is normally unidirectional and ranges in magnitude from a few microvolts to perhaps a few millivolts. This means that a large amplification is normally required to produce an observable manifestation of some kind; particularly is this true in null-type measuring systems such as are generally employed to obtain the most accurate results.

It is a well known fact that alternating currents can be more readily and reliably amplified by electronic means than can direct currents of corresponding magnitudes. Accordingly, there exist several means for converting direct currents into alternating currents. Among the methods which have been employed for this purpose is the dynamic condenser, or as it is often called, the capacitative commutator.

Essentially, the dynamic condenser, or capacitative commutator, is a generator of electricity, and it may be used in a variety of ways, for example, as an inverter, transducer or modulator. It may be used as an inverter to couple a slowly varying direct current source of potential into an alternating curent amplifier. This requires that the dynamic condenser produce an alternating current signal whose magnitude is a known function of the impressed direct current voltage. Since the direct electromotive force being measured often originates in an extremely high resistance circuit, and since this potential is extremely small, it is very important in the art of electrometry that the inverter consume no power from the source. These features are usually obtained in a dynamic condenser type inverter by isolating, as far as direct current is concerned, one plate of a pair forming a condenser and periodically relatively moving the plates so that the capacity of the condenser thus formed varies periodically. In this way an alternating current is generated whose magnitude is a function of the electric charge on the condenser plates. At the same time, no energy from the source is consumed by the dynamic condenser, although some energy may be lost through leakage and shunting-resistors. The energy for the conversion process is all supplied by the mechanism which moves the plates of the dynamic condenser relatively to each other.

If the charge collecting on the dynamic condenser plates is controlled by an ionization chamber, photocell, glass electrode, or like device, one has at his disposal a highly sensitive detector of ionizing radiation or other electric charge producing agency.

Although systems of the prior art which employ dynamic condenser type electrometers have met with a degree of success, they suffer from defects in the design of the dynamic condensers as well as in the electrical circuits in which the dynamic condensers are used. These defects prevent a complete and more perfect utilization of these devices as remote indicators of radiation and other charge producing agencies.

One of the problems unsolved by prior art systems is that of eliminating signals corresponding to undesirable noises which tend to mask the desired signal. The term "noise" is used here to designate spurious voltages of a random character that represent energy more or less uniformly distributed over an appreciable frequency band. Accordingly, a means must be employed which permits the least possible noise to enter the system. In alternating current systems, this generally means a restricted frequency band of signal currents. The restriction of band width brings in the impedance function and a choice of relative impedance levels must be made with the dynamic-condenser electrometers presently used. The output impedance, while much lower than the input impedance is still of the order of hundreds or thousands of megohms. At such an impedance level it is not convenient to restrict the band width by means of filters.

Closely related to the problem of obtaining restricted band width is the problem of transmission of signals between the points of observation and the point of measurement. Remotely placed observation instruments must obviously be connected to the measuring or indicating instruments by some means. Usually, this is by means of a cable containing one or more electrical conductors, although in some applications it could conceivably be a radio link. In any event, the problem reduces to one and the same thing; that of coupling a high impedance source of potential to a low impedance cable or antenna. The output impedance of the electrometers presently used is much too high to couple directly into a cable; moreover, these single-ended structures do not permit the efficient use of transformers between electrometer and cable.

This brings to light a further problem, that of signal sensitivity. The signal level developed by the dynamic condenser must be sufficiently high as to produce a reasonable signal to noise level at the point where amplification by electronic means can be had, and where bandpass filters can be used. Due to the low vibrating frequencies presently used by most dynamic-condenser electrometers, the relatively large condenser plate spacings and the absence of any resonance features in the electrical part of the dynamic condenser system, sufficient signal energy is not generated by apparatus of the prior art to permit the elimination of electronic amplifiers at the point of observation.

Another problem is that of making a number of observations simultaneously while employing only a single conductor armored cable between the points of detection and the point of observation. The dynamic condensers described in this invention find particular application in the multiplex radioactivity well logging system of this invention.

In its preferred form, the dynamic condenser comprises a rectangular cantilever bar caused to oscillate simultaneously in the two directions perpendicular to its flat faces at driving frequencies which are the resonant frequencies for oscillation in said directions. In one form of this invention the faces of the cantilever bar act as condenser plates, and opposing plates parallel thereto, insulated therefrom and separated therefrom by air, complete the condenser. Insulated plates mechanically attached to the bar may be used as condenser plates instead of the faces of the bar itself. Movement of the bar varies the capacitances between plates and bar at the two driving frequencies, and when an information signal is applied, which may be direct current, signals are produced modulated by the information signal and at derived frequencies which are the sum and difference of the driving frequencies. The driving frequencies are selected so that the derived frequencies differ from the driving frequencies. Therefore, by filtering a modulated signal may be isolated. In a multiplex well logging system this permits the subsurface dynamic condenser to be driven from the surface at two driving frequencies and the information may be sent to the surface at a third derived frequency. Obviously, any number of channels of information may be provided so long as different frequencies are used.

The dynamic condenser of this invention finds particular application in a self-balancing null-type detecting system such as illustrated by United States Patent No. 2,219,274, which issued October 22, 1940. In such a system a servomechanism feeds back a nulling signal to the subsurface apparatus to balance the voltage produced by ionization current. The difference between the signal voltage and the null voltage is a direct current error signal which is converted to alternating current by a dynamic condenser. In utilizing the dynamic condenser of the instant invention, any number of error signals may be transmitted by the proper combination of driving frequencies as described above. The nulling voltage for each channel may be sent down the logging cable at different frequencies and may be isolated by filters in the subsurface instrument and then rectified and used for nulling. Alternatively, one channel may use the conventional direct current feed-back, and two more channels may use positive and negative pulse feed-back which may be isolated from the alternating current error signals and driving frequencies.

Therefore, it is an object of the present invention to provide a multiplex well logging system wherein a number of channels of information may be sent simultaneously from the subsurface detector to the surface recording apparatus. It is a further object of the present invention to provide a multiplex radioactivity well logging system utilizing a plurality of self-balancing nulling systems and providing for the transmission of all signals over a single insulated conductor. Still another object of the present invention provides a novel dynamic condenser for use in a multiplex transmission system. And still another object of this invention is to provide a dynamic condenser which may be driven in two directions at two driving frequencies and which provides a derived modulated signal at a derived frequency which is the sum or difference of the driving frequencies and may be filtered therefrom.

Other objects and advantages of the present invention will become apparent from the following detailed description when considered with the accompanying drawings in which.

Although the instant invention has broad application in the field of electrometry wherein it is desired to detect or measure phenomena such as extremely feeble electric currents, the presence and magnitude of small electric charges, the state of electrification of different bodies, the specific description thereof will be made in connection with a radioactive well logging operation.

Figure 1:
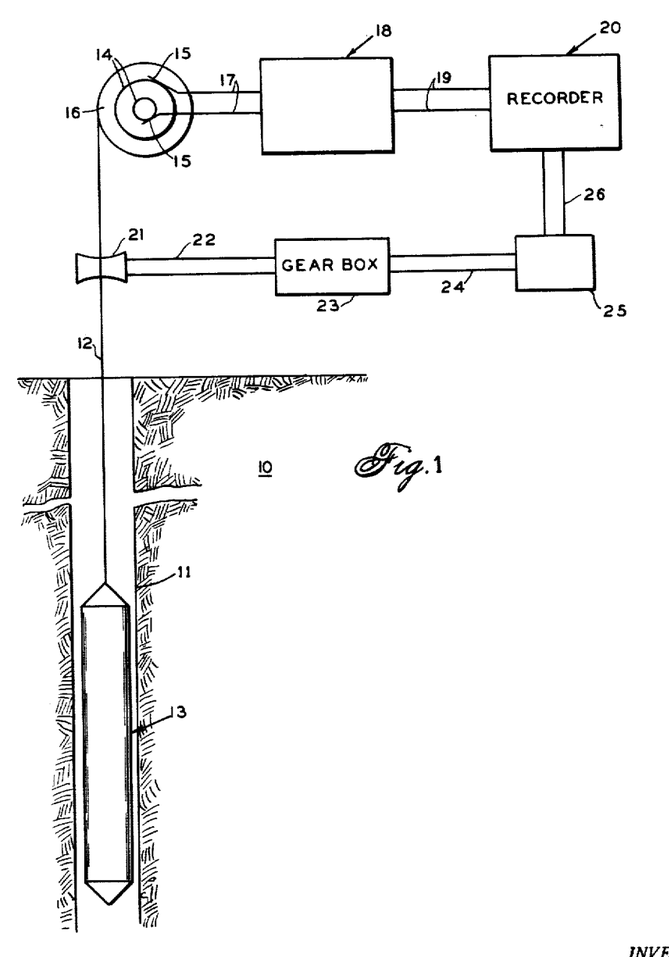
FIGURE 1 is a diagrammatic illustration of a radioactivity well logging system.

Referring to the drawings, particularly FIGURE 1, there is illustrated a conventional well logging operation. In this figure, 10 denotes a fragmentary vertical section of the earth's surface having a well 11 drilled therein. Well 11 may be either cased or uncased, since the operation pertains to radioactivity well logging. Suspended in the well 11 by a cable 12 is a subsurface instrument 13 having the shape of an elongated bomb or capsule. Subsurface instrument 13 houses means for detecting radioactive radiation by producing an electrical current which varies in magnitude in systematic relation to the intensity of the radioactive radiation impinging upon the detector.

Since this electrical current is quite feeble, it is conditioned by mechanical and electrical elements, also contained in the capsule 13, and introduced on the cable 12 by means of which it is transmitted to the surface of the earth. At the surface this electrical current is taken from the cable 12 through the medium of sliprings 14 and brushes 15 on one end of the drum 16 upon which the cable 12 is wound or unwound as the subsurface instrument 13 is caused to be raised or lowered in the well 11. The electrical current is conducted, by conductors 17, to the assemblage of elements 18 where it is further processed before being conducted, by means of conductors 19 to a recorder 20. Recording of the electrical current is effected in correlation with the depth at which detection occurred by driving the recorder chart through conventional means by the cable 12. In FIGURE 1 these means are illustrated by a pulley 21 adapted to be driven by the cable 12. Pulley 21 drives the recorder strip through the medium of shaft 22, gear box 23, shaft 24, gears 25 and the shaft 26. Since the recorder strip drive is conventional it could just as well comprise a selsyn system.

Figure 2:
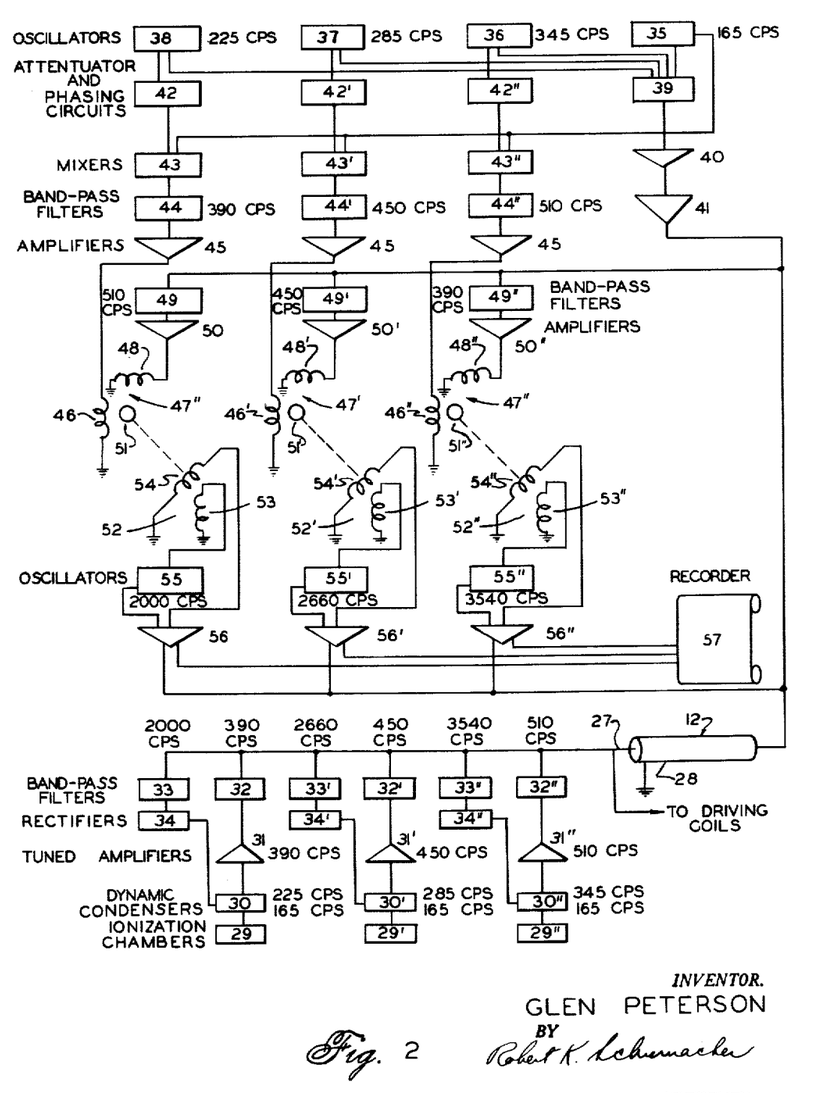
FIGURE 2 is a diagrammatic illustration of the complete detecting, transmitting and recording system for multiple measurements in a borehole over a single conductor cable.

In FIGURE 2 there is illustrated schematically all of the electrical and mechanical elements housed within the bomb or capsule 13, the surface electrical system and the recorder. The surface and subsurface systems are electrically connected together by means of the central conductor 27 and armor sheath 28 of cable 12, as shown.

Referring specifically to FIGURE 2 the radioactivity detectors may be conventional ionization chambers 29.

Variations of the radiations impinging upon the ionization chambers will produce variations in the flow of direct current in the electrode circuits thereof. These varying direct currents flowing through respective resistors to ground will produce varying direct potentials which appear on the moving plates of the dynamic condensers 30. Pertinent details of this circuit and apparatus will be described subsequently. These differences in potential between the moving and stationary plates of the dynamic condensers will produce alternating current in the circuits of which the plates form parts. Because the elements of each dynamic condenser are driven at two frequencies, alternating currents at the sum and difference frequencies of the driving frequencies are derived. These alternating currents will vary in amplitude, that is be modulated, in proportion to the applied direct potentials and the latter will vary in accordance to the radiation incident on the respective ionization chambers.

Although any of these derived frequencies could be used as the signal frequencies so long as they differ from the driving frequencies, the first order sum frequencies are preferred, since they are higher and more easily processed in the present instance. These are applied to amplifiers 31, 31' and 31". The only difference in these amplifiers is that each is tuned to the appropriate sum frequency, as 390, 450 and 510 c.p.s. where the driving frequencies used are 165, 225, 285 and 345 c.p.s., as shown. Other frequencies could be employed.

After amplification, the modulated signals at the chosen derived frequencies are passed through selective filters 32, 32' and 32" where any undesired frequencies that were produced by the dynamic condensers or otherwise present and passed by the amplifiers 31 are greatly attenuated. The output terminals of the band-pass filters 32 are connected to the cable 12 and the currents passed to the surface equipment.

Electrical energy to operate the amplifiers 31 is obtained from the driving alternating currents, supplied by the surface equipment through the conventional means of transformers, rectifiers and filters, as needed. Such means as are thus employed is auxiliary to the invention and, being conventional, are not described further. By the same token, the amplifiers, filters, oscillators, mixers, attenuators, of this invention are conventional unless otherwise denoted and therefore are likewise not described in detail.

The surface equipment shown in FIGURE 2 is in part comprised of a set of four oscillators 35, 36, 37 and 38 which produce the driving frequencies. These oscillators may have separate amplitude and frequency controls of conventional design and the outputs from them are fed into a common attenuator 39, through isolation circuits contained therein, thence to a pre-amplifier 40, a power amplifier 41, and from there into the cable. By means of the attenuators and frequency controls provided, the amplitudes of motion of the dynamic condensers can be set, together with the combination frequencies required. The dynamic condensers are driven substantially at their mechanically resonant frequency in order to obtain large oscillations with low driving power, however, it has been found experimentally that it is desirable to operate the dynamic condensers slightly off mechanical resonance to avoid rapid phase changes in the motion that might result through operating too near exact mechanical resonance. Because of this, it is quite easy to set the oscillator frequencies to produce the desired sum frequencies at all times.

Power to energize the subsurface equipment is thus supplied by the oscillators and amplifiers above described. A set of motor-driven, multiple-pole electric generators may also be used, in place of the oscillators and amplifiers, to supply the subsurface power.

In the preferred form of this invention, a nulling or follow-up system which may be self-balancing, or manually operated, is employed. Such nulling or follow-up systems make it possible to eliminate most of the errors in measurement which might result from variations in amplifier gains, cable leakage and other similar causes. They have been much used in recent years in many types of electronic and mechanical systems. One such system is described in the above-noted United States Patent No. 2,219,274.

In such a system, the current in an ionization chamber develops a direct current voltage across a load resistor. An opposing voltage is developed across a nulling resistor also in the subsurface instrument by a nulling current sent from the surface. The difference in the two voltages is an error signal which is converted to alternating current and sent to the surface with a phase reference signal to control a self-balancing potentiometer which provides the nulling current. The position of the potentiometer is recorded as an indication of the nulling current and hence of ionization current and incident radiation.

The nulling or follow-up system employed in one form of the present invention requires that the sum frequencies provided in the subsurface equipment by the dynamic condensers, and on which the signal to be measured is modulated, be produced in the surface equipment to provide phase reference. To this end, some of the oscillators are connected through phasing and attenuator circuits 42 into mixing circuits 43 and at least one of the oscillators is connected directly to mixers 43 to obtain the same sum and difference frequencies as were produced by the dynamic condensers of the subsurface equipment. These may therefore be used as phase reference signals to identify the relative phases of the modulated signals. Following the mixers and connected thereto are suitable band-pass filters 44, 44' and 44" which attenuate currents of all frequencies except those desired. The phase reference signals are amplified by amplifiers 45 and applied to one winding 46 of two-phase motors 47. By means of the phasing circuits provided in units 42, the phase of currents flowing in motor windings 46, can be set to any desired value relative to the respective synchronous subsurface derived signal currents which are applied to windings 48 of the two-phase motors 49. These latter currents were applied to the subsurface end of the single-conductor cable 12, as before described, and are taken from the surface terminals of said cable, separated by means of band-pass filters 49, 49' and 49", separately amplified by means of amplifiers 50 and then applied to motor windings 48, as before stated.

In general, the relative phases of the currents in motor windings 46 and 48 will be ±90°. The 90-degree relationship is set by means of the phasing circuits in 42, and at any particular moment the phase can be positive or negative as determined by the state of null at the dynamic condensers and therefore by the incident radiation on the radiation transducers or ionization chambers 29. If the relative phase is positive, the two-phase motors turn in one direction; providing the currents in windings 48 are not zero. If the relative phase is negative the two-phase motors turn in the opposite direction, again providing current in windings 48 is different from zero. If said currents in windings 48 are zero, the motors 47 turn not at all, and this is the null-condition that is constantly sought.

Each two-phase motor 47 has an armature 51, and attached to each armature is a rotary transformer 52. The mechanical attachment between armatures 51 and rotary transformers 52 is preferably through a gear box of conventional design, but may, if desired, be made directly. Rotary transformers 52 are comprised fundamentally of two windings 53 and 54. Windings 53 are stationary and connected to nulling carrier oscillators 55, 55' and 55" respectively, as shown. Windings 54 are rotatable being attached mechanically to the shafts of the rotary transformers which shafts are mechanically coupled to the two-phase motor armatures as before described.

The relative rotational positions of the two windings 53 and 54 are determined by the currents in the two-phase motor windings which therefore determine the coupling between the two transformer windings and hence the magnitude of nulling carrier voltage produced at any given moment. Said nulling carrier voltages are applied to isolating amplifiers 56 together with steady voltages of the same frequencies, respectively. The amplitudes of these steady voltages are controlled by means of suitable attenuators within said isolating amplifiers 56 and are provided so that the nulling operation has a sense of direction as will be more completely described subsequently. In essence it may be said that the nulling carrier amplitudes vary up and down from the steady voltages in accordance with the direction and degree the subsurface equipment is off null and hence in accordance with the radiation produced subsurface signals. The nulling carriers are transmitted via the same cable 12 to the subsurface instrument, where they are separated by means of band-pass filters 33, 33' and 33", and rectified and smoothed by means of rectifier filters 34 which have suitable time constants. The rectified nulling-carrier voltages are then applied to the dynamic condenser in a manner off-setting or nulling the radiation produced unidirectional signal. Details of these processes, structures and operations will be given below.

In a well logging instrument, the nulling carriers derived in isolating amplifiers 56 are fed to recorder 57 where they are rectified and recorded by means of galvanometers, moving pens or other conventional means.

Although the apparatus has been described for use in radioactivity well logging, it may be used for any measurements where it is desirable that feeble currents be measured by a null system. The radioactivity well logging system has been described using three channels of information, but as many may be used as are desired. The three measurements conventionally made are of natural gamma radiation, neutron induced gamma radiation, and scattered neutrons.

Figure 3:
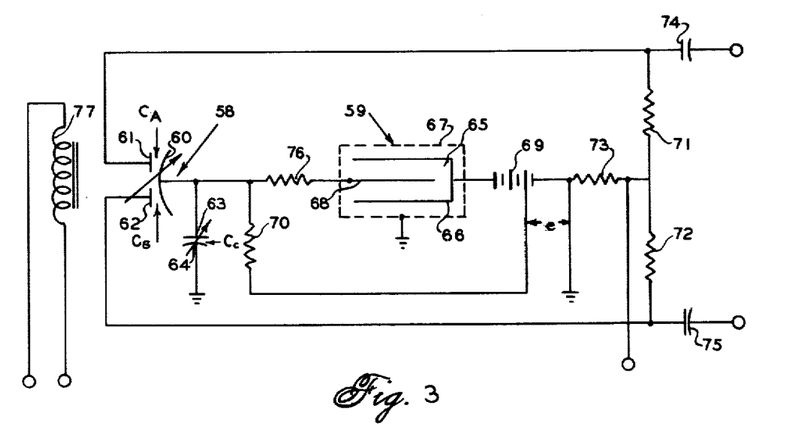
FIGURE 3 is a schematic illustration of the dynamic condenser of this invention and illustrates its operation in the system of FIGURE 2.

Operation of the multiplex system which employs dynamic modulators as translation devices, or null indicators, is best understood by referring to FIGURE 3 which shows in schematic form a typical dynamic condenser 53 in circuit arrangement with a radiation detector or transducer 59, of the ionization chamber type, together with other suitable circuit elements. One form of dynamic condenser is comprised of three pairs of condenser plates 60 and 61 forming the capacity $C_A$, 60 and 62 forming the capacity $C_B$, and 63 and 64 forming the capacity $C_C$. The plates 61, 62 and 64 are stationary; plate 60 moves differentially at frequency $f_1$ with respect to plates 61 and 62 so that as capacity $C_A$ increases, capacity $C_B$ decreases and vice versa. Plate 63 moves at frequency $f_2$ with respect to plate 64 so that capacity $C_C$ varies periodically at $f_2$ frequency.

Radiation incident upon ionization chamber 59 causes the gas 65 within the chamber to become ionized. The pail 66 of the ionization chamber is maintained at a potential difference with respect to the external housing 67 and center electrode 68, by means of battery 69 or any other suitable source of E.M.F. This potential difference causes the radiation produced ions to migrate to the pail and center electrode thereby producing a small ionization current flow in resistor 70 and, as a result, a potential drop across it. This potential drop or detection voltage, which is a measure of the incident radiation, is applied to dynamic condenser plates 60 and 63 together with a small fixed potential $e$ derived from battery 69. This fixed potential $e$ is for the sake of simplicity shown as being a finite fragment of 69, such as one cell, but it could be made effectively less than one cell by means of the well known resistive type potential divider.

The fixed dynamic condenser plates 61, 62 and 64 being directly or effectively at ground potential as far as the unidirectional radiation signals and the D.-C. bias $e$ are concerned, a field is built up across the capacities $C_A$, $C_B$ and $C_C$ which is a function of said unidirectional signal and bias. It can be shown both experimentally and mathematically that under the given conditions, currents of the sum and difference frequencies of $f_1$ and $f_2$ are produced in the circuit comprised of the foregoing elements and resistors 71, 72 and 73, and the amplitudes and polarities (phases) of these sum and difference frequencies are determined by the sum of the radiation-produced potential drop across 70, the bias voltage $e$, and the feed-back or nulling voltage produced as an IR drop across 73. When the sum of these voltages is zero, the magnitudes of the currents at the sum and difference frequencies of $f_1$ and $f_2$ is zero, and the system is connected and phased to produce this result automatically.

The dynamic-condenser and ionization chamber derived alternating currents produce a potential drop across resistors 71 and 72, and it is this potential which is amplified. A typical amplifier 31 preferably has a push-pull input stage connected to resistors 71 and 72 by means of coupling condensers 74 and 75. Following the amplifier a selective filter preferably picks the signal of the sum frequency, and the system operates as previously described. 76 is an isolating resistor to prevent A.C. from flowing back into the ionization chamber. 77 is the dynamic condenser driving coil upon which power, at frequencies $f_1$ and $f_2$ is impressed.

In each instance, the rectified nulling carrier voltage is applied across resistor 73. The initial amplitude of this voltage is set by the attenuator in isolating amplifier 56 to exactly offset the bias voltage $e$ alone, thereby producing the "zero" for the radiation measurement. Under this condition the shaft of the rotary transformer 52 is turned to produce zero output, from winding 54, and this condition can be obtained at two shaft positions 180° apart. That zero output shaft position is chosen which properly phases the nulling carrier with respect to the system, that is, when radiation is incident upon a transducer 29, the overall nulling carrier amplitude will be increased to offset it. When this shaft position is determined the rotary transformer shaft is locked to the appropriate two-phase motor shaft. In this way, the system is given a sense of direction about the null point which it would not otherwise have.

Figure 4:
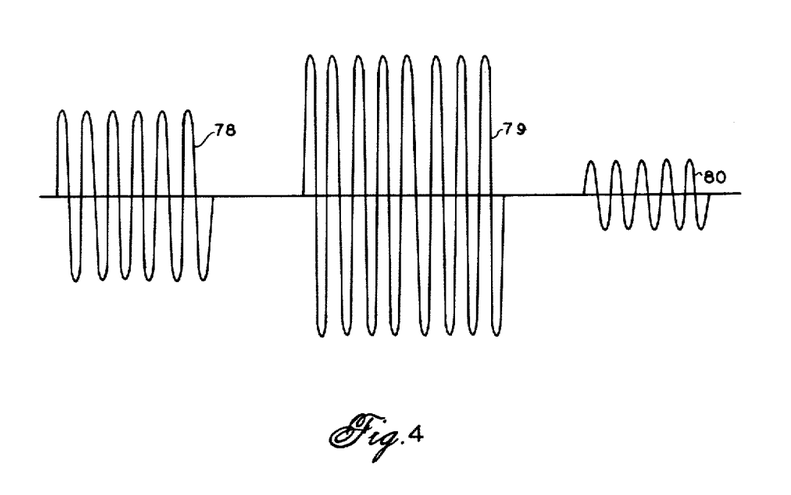
FIGURE 4 illustrates the wave form of the feed-back voltages for nulling the system of FIGURE 2.

This feature is made more clear by referring to the graphs of FIGURE 4 where three different typical carrier levels are shown. 78 represents the fixed or "zero" signal carrier level; 79 represents the signal increased carrier level; and 80 represents the over-nulled or feed-back reduced carrier level. Without the reference voltage *e*, the zero condition would be with no steady carrier. The steady carrier provides sense to the nulling system for there is no other phase reference for the nulling signal. The nulling signal adds to or subtracts from the steady component of the carrier. This prevents the nulling signal from over-correcting for the error voltage (the difference between the ionization produced detection voltage across resistor 70 and the nulling voltage across resistor 73), a condition which the feed-back system could not correct without sense; for the nulling system would be unstable.

Quite a few variations of the dynamic condenser translation device have been constructed. Fundamentally, it is clear that any two capacities having the ionization chamber signal applied to them in common but varied at two different frequencies will produce the result sought. Likewise, a single condenser, the capacitance of which is varied at two different rates simultaneously, and across the plates of which the ionization chamber signal is applied, will produce the desired result. Such a drive can be obtained by periodically interrupting the driving frequency current. The preferred embodiment of the dynamic condenser comprises a bar driven in two perpendicular directions at different frequencies with condenser plates thereon so that one condenser varies in capacity at one frequency while another condenser varies in capacity at a different frequency. This is largely for simplicity and compactness, and it is contemplated that condensers entirely separate mechanically could be varied at the different frequencies.

One embodiment of the mechanical structure of the dynamic condenser is illustrated by FIGURES 5, 6, 7, 8, 9 and 10. Therein, 81 is the overall instrument housing or casing, 82 is the internal supporting framework to which most of the parts and pieces are assembled and which in turn fits snugly inside the housing 81. The two pieces 83 comprise magnetic yokes which carry the magnetic flux from the adjustable pole-pieces 85, 86, 87 and 88 into the massive steel armature base 84. The portion of the armature 89 between pole pieces and conically-shaped seat is composed of ferromagnetic material having excellent elastic properties. The portion of the armature from pole-pieces toward the left-hand extremity where the condenser plates are carried is preferably made of a strong but light aluminum alloy. Between the pole-pieces and the portion where the condenser plates are carried, the armature has a threaded section 91 and a double-nut assembly 92 which can be adjusted back-and-forth to assist in adjusting the operating frequency of the armature. The two resonant frequencies of the armature blade, however, are largely determined by the blade dimensions in the two perpendicular driving directions of the armature region 93 just above the conical seat, and as illustrated by the cross-hatched central portion 94 of FIGURE 7.

Figure 5:
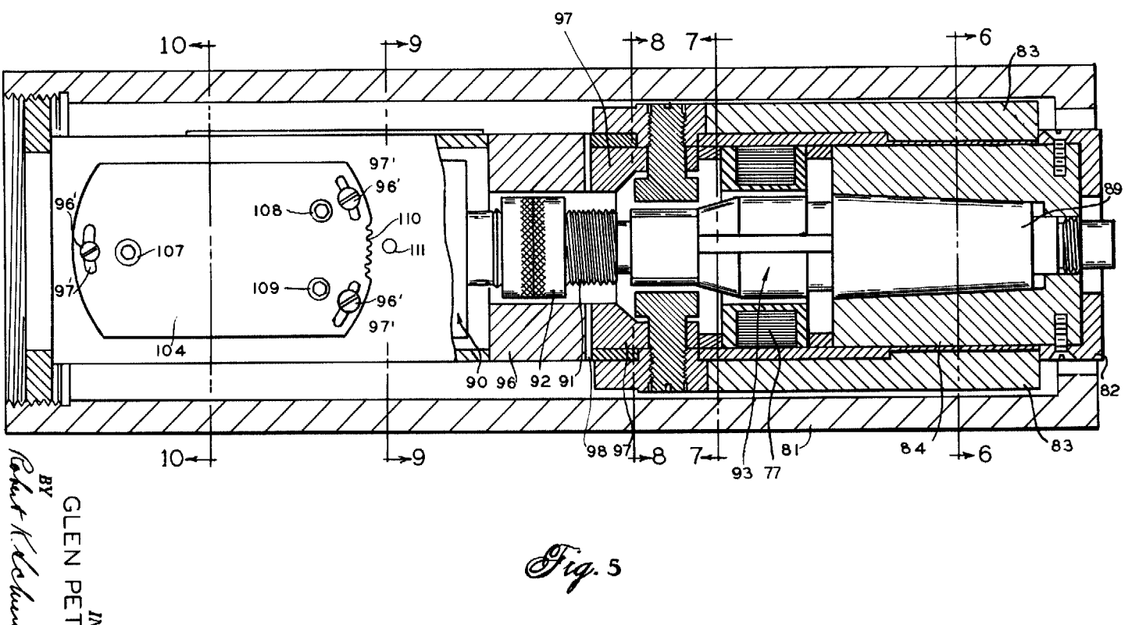
FIGURE 5 is a view partly in vertical section of the form of dynamic condenser preferred for use in the system of FIGURE 2.
Figures 6, 7:
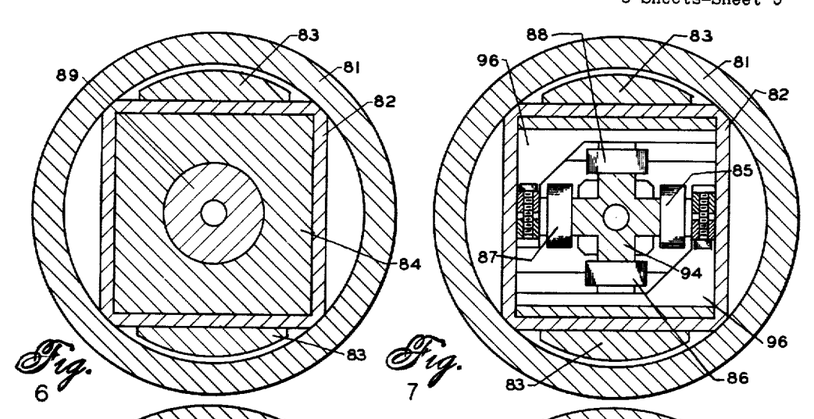
FIGURE 6 is a horizontal sectional view of the dynamic condenser taken through section 6—6 of FIGURE 5.
FIGURE 7 is a horizontal sectional view of the dynamic condenser taken through section 7—7 of FIGURE 5.

The driving coil 77 is situated about the frequency-determining crossed-portion of the armature. The device is magnetically polarized by means of a U-shaped magnet 96 which rests on two identical magnetic yokes 97, there being non-magnetic spacer shims 98, such as brass shims, between magnet 96 and yokes 97 to keep from short-circuiting the alternating driving flux through the magnet. If the magnet has a low incremental permeability, such as manifest by Alnico V, the brass shims become unnecessary.

As noted, the left-hand portion of the dynamic condenser structure, as illustrated by FIGURE 5 contains the condenser plates. These structures are best illustrated by means of section FIGURES 9 and 10. The aluminum armature extension is again shown as 90, and to it is fastened an insulating member 99, and to the insulating member the condenser plate 63. This is the movable plate. The fixed condenser plate 64 is fastened to insulator 100 and thence to adjustable frame 101, and the latter is in turn fastened to instrument framework 82. Fixed condenser plates 61 and 62 are fastened to insulators 102 and 103, respectively, and these insulators are in turn fastened to adjustable frame 104. Movable condenser plate 60 is fastened to insulator 105 and this insulator is in turn fastened to armature extension 90. All fastenings are made by means of machine screws or other conventional methods.

Figures 8, 9:
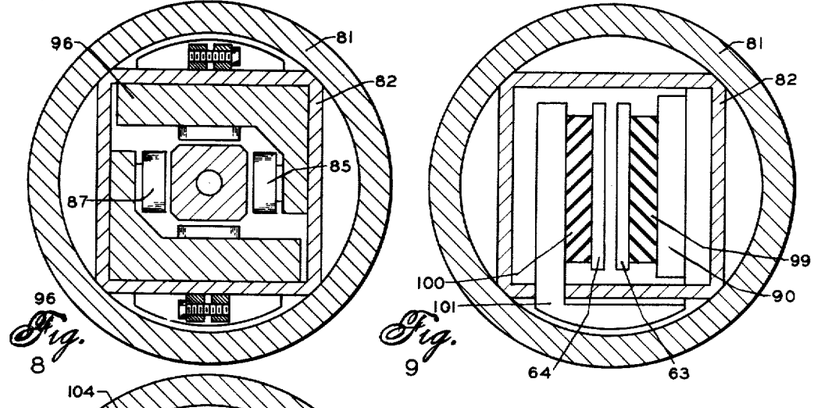
FIGURE 8 is a horizontal sectional view of the dynamic condenser taken through section 8—8 of FIGURE 5.
FIGURE 9 is a horizontal sectional view of the dynamic condenser taken through section 9—9 of FIGURE 5.
Figure 10:
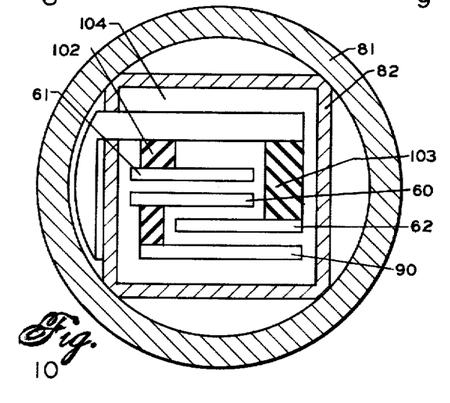
FIGURE 10 is a horizontal sectional view of the dynamic condenser taken through section 10—10 of FIGURE 5.

Each of the fixed condenser plate supporting frames, for example, 104, is adjustably fastened to frame 82 by means of screws 96' through slots 97' so that the condenser plates 61 and 62 may be made parallel to plate 60. Likewise a level adjustment is provided by means of three screws 107, 108 and 109. A toothed edge 110 is provided on frame 104 so that the parelleling adjustment can be assisted by means of a toothed key piloted in hole 111. For best operation, the plates forming each condenser should be as nearly parallel as possible, the plate separation as small as possible, and the plate motion near the maximum possible without touching.

Although it is preferred that the system contain all of the components above described, the system is operative using certain other conventional components. An essential part of the system is the surface phase reference. However, power may be supplied by subsurface batteries instead of from the surface. The subsurface power is all derived from the power applied at all the frequencies; the composite signal may be rectified and isolated for such uses as vacuum tube filaments or plate supplies. The ionization chamber voltages may be supplied through the single direct current channel. An alternative to the preferred motor controlled rotary transformer is the system of the prior art as described above and in United States Patent No. 2,219,274. The self-balancing potentiometer of the prior art may be used to supply a modulated carrier for nulling as above described in connection with the rotary transformer, or where the direct current channel is not otherwise used, one nulling current can be sent back as direct current and the other two nulling currents may be sent back as pulses, one set positive and one negative. Obviously, any combination may be used.

Although only three channels have been described, any number of channels of information may be transmitted so long as different frequencies are used. It is to be understood that this invention is not to be limited to the specific modifications described but is to be limited only by the following claims.

I claim:

1. A dynamic condenser for a multiplex transmission system comprising a chassis, a bar, means for rigidly mounting said bar on said chassis with one end free, at least one condenser plate rigidly mounted on the free end of said bar, at least one fixed condenser plate disposed opposite each mounted plate and insulated and spaced therefrom to provide electrical capacitance therebetween, electrical means for accelerating the free end of said bar in different directions at substantially the resonant frequencies for oscillation of said bar in said directions thereby causing capacitance to vary at said frequencies, and means for applying signal on at least one varying capacitance thereby deriving signals modulated by said applied signal and at derived frequencies which are the sum and difference of the frequencies of said accelerating means.

2. A dynamic condenser for a multiplex transmission system comprising a chassis, a bar, means for rigidly mounting said bar on said chassis with one end free, at least one condenser plate rigidly mounted on the free end of said bar and insulated from said chassis, at least one fixed condenser plate disposed opposite each mounted plate and insulated and spaced therefrom to provide electrical capacitance therebetween, electrical means for accelerating the free end of said bar in different directions at substantially the resonant frequencies for oscillation of said bar in said directions thereby causing capacitance to vary at said frequencies, and means for applying signal on at least one varying capacitance thereby deriving signals modulated by said signal and at derived frequencies which are the sum and difference of the frequencies of said accelerating means.

3. A dynamic condenser for a multiplex well logging system comprising a cantilever bar rigidly mounted at one end with the other end free to move in any direction perpendicular to the axis of said bar and having on the free end at least two plane surfaces substantially perpendicular to each other and substantially parallel to said axis, at least one fixed planar plate disposed substantially opposite each of said plane surfaces and substantially parallel thereto and insulated and spaced therefrom to provide electrical capacitance therebetween, at least two independent electrical means for independently accelerating the free end of said bar in directions substantially perpendicular to said plates at substantially the resonant frequencies for oscillation of said bar in said directions thereby causing said capacitances to vary at said frequencies, and means for applying signal on at least one of said varying capacitances thereby deriving signals modulated by said applied signal and at derived frequencies of said accelerating means.

4. A dynamic condenser for a multiplex well logging system comprising a cantilever bar rigidly mounted at one end with the other end free to move in any direction perpendicular to the axis of said bar and having rigidly mounted on the free end and insulated therefrom at least two planes perpendicular to each other and parallel to said axis at least one fixed plate disposed opposite each of said mounted plates and insulated and spaced therefrom to provide electrical capacitance therebetween, two independent electrical means for independently accelerating the free end of said bar in directions perpendicular to said plates at substantially the resonant frequencies for oscillation of said bar in said directions thereby causing said capacitances to vary at said frequencies, and means for applying signal on at least one of said varying capacitances thereby deriving signals modulated by said applied signal and at derived frequencies which are the sum and difference of the frequencies of said accelerating means.

5. A multiplex well logging system comprising in combination a subsurface unit, a surface measuring unit, a single conductor cable electrically connecting elements of the subsurface unit to elements of the surface unit and adapted to raise and lower the subsurface unit in the well, said subsurface unit having an elongated housing, a plurality of detecting elements in said housing adapted to produce electrical signals proportionally related to the respective parameters that are to be measured, at least one dynamic modulator having a vibrating armature also disposed in said housing that is adapted to convert said detection signals to alternating current signals, at least two condensers having one plate of each mounted on said armature and adapted to be moved by the armature with respect to the other plates, means for simultaneously driving said armature in two planes which are at right angles to each other, means forming an element of the surface measuring unit for supplying driving power over the single conductor cable to said driving means, and impedance matching means for connecting the output of said modulator to the single conductor cable.

6. A multiplex well logging system comprising in combination a subsurface unit, a surface measuring unit, a single conductor cable electrically connecting elements of the subsurface unit to elements of the surface unit and adapted to raise and lower the subsurface unit in the well, said subsurface unit having an elongated housing, a plurality of detecting elements in said housing adapted to produce electrical signals proportionally related to the respective parameters that are to be measured, at least one dynamic modulator having a vibrating armature also disposed in said housing that is adapted to convert said detection signals to alternating current signals, at least two condensers having one plate of each mounted on said armature and adapted to be moved by the armature with respect to the other plates, means for simultaneously driving said armature in two planes which are at right angles to each other, means forming an element of the surface measuring unit for supplying driving power over the single conductor cable to said driving means, impedance matching means for connecting the output of said modulator to the single conductor cable, and means also forming an element of the surface measuring unit for supplying alternating current power to the elements of the subsurface unit over the single conductor cable.

7. A multiplex well logging system comprising in combination a subsurface unit, a surface measuring unit, a single conductor cable electrically connecting elements of the subsurface unit to elements of the surface unit and adapted to raise and lower the subsurface unit in the well, said subsurface unit having an elongated housing, a plurality of detecting elements in said housing adapted to produce electrical signals proportionally related to the respective parameters that are to be measured, at least one dynamic modulator having a vibrating armature also disposed in said housing that is adapted to convert said detection signals to alternating current signals, at least two condensers having one plate of each mounted on said armature and adapted to be moved by the armature with respect to the other plates, means for simultaneously driving said armature in two planes which are at right angles to each other, means forming an element of the surface measuring unit for supplying driving power over the single conductor cable to said driving means, impedance matching means for connecting the output of said modulator to the single conductor cable, means also forming an element of the surface measuring unit for supplying alternating current power to the elements of the subsurface unit over the single conductor cable, and additional means forming an element of the surface measuring unit for supplying over the single conductor cable direct current milling power to the subsurface unit.

8. A multiplex well logging system comprising in combination a subsurface unit, a surface measuring unit, a single conductor cable electrically connecting elements of the subsurface unit to elements of the surface unit and adapted to raise and lower the subsurface unit in the well, said subsurface unit having an elongated housing, a plurality of detecting elements in said housing adapted to produce electrical signals proportionally related to the respective parameters that are to be measured, at least one vibrating armature type dynamic modulator also disposed in said housing that is adapted to convert said detection signals to alternating current signals of different frequencies, at least two condensers having one plate of each mounted upon the armature and adapted to be moved in a vibrating motion with respect to the other plate, means for driving said armature in two directions simultaneously and at different frequencies, and impedance matching means for connecting the output of said modulator to the single conductor cable.

9. A multiplex well logging system comprising in combination a subsurface unit, a surface measuring unit, a single conductor cable electrically connecting elements of the subsurface unit to elements of the surface unit and adapted to raise and lower the subsurface unit in the well, said subsurface unit having an elongated housing, a plurality of detecting elements in said housing adapted to produce electrical signals proportionally related to the respective parameters that are to be measured, at least one vibrating armature type dynamic modulator also disposed in said housing that is adapted to convert said detection signals to alternating current signals of different frequencies, at least two condensers having one plate of each mounted upon said armature and adapted to be moved in a vibrating motion with respect to the other plate, means for driving said armature in two directions simultaneously and at different frequencies, impedance matching means for connecting the output of said modulator to the single conductor cable, means forming a part of said surface measuring unit for separating the alternating currents, means for demodulating said currents, and means for separately measuring the modulation products.

References Cited in the file of this patent

UNITED STATES PATENTS

| | | |
|---|---|---|
| Re. 21,366 | Plensler | Feb. 20, 1940 |
| 2,398,761 | Aiken | Apr. 23, 1946 |
| 2,573,133 | Greer | Oct. 30, 1951 |
| 2,659,014 | Scherbatskoy | Nov. 10, 1953 |
| 2,887,647 | Strozier | May 19, 1959 |

UNITED STATES PATENT OFFICE
CERTIFICATE OF CORRECTION

Patent No. 3,091,695                    May 28, 1963

Glen Peterson

It is hereby certified that error appears in the above numbered patent requiring correction and that the said Letters Patent should read as corrected below.

Column 11, line 26, after "frequencies" insert -- which are the sum and difference of the frequencies --.

Signed and sealed this 3rd day of November 1963.

(SEAL)                                            EDWIN L. REYNOLDS
Attest:
ERNEST W. SWIDER                                                           Acting Commissioner of Patents
Attesting Officer